M. W. BECKETT.
FLYTRAP.
APPLICATION FILED SEPT. 12, 1921.
1,413,155. Patented Apr. 18, 1922.
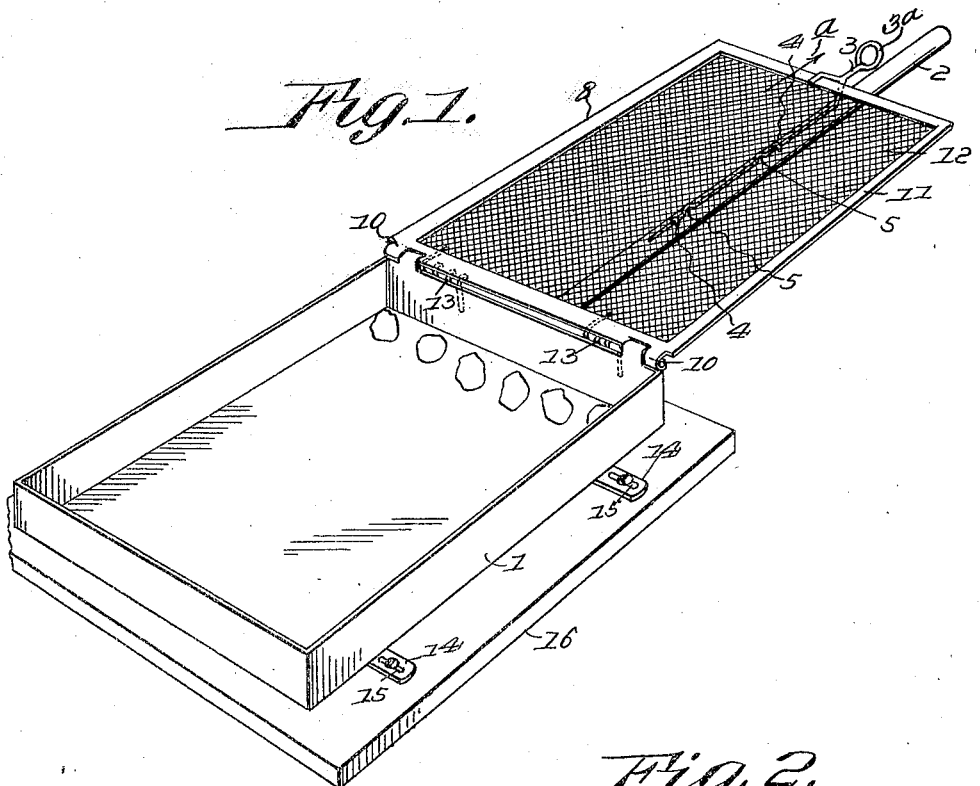
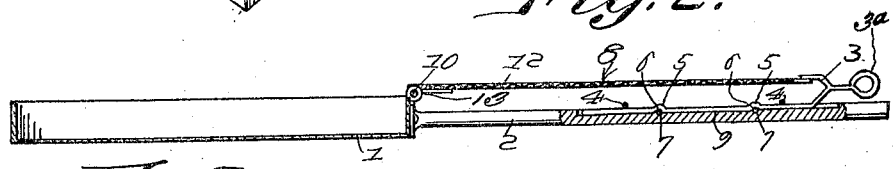
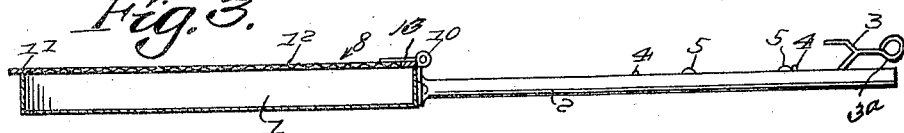
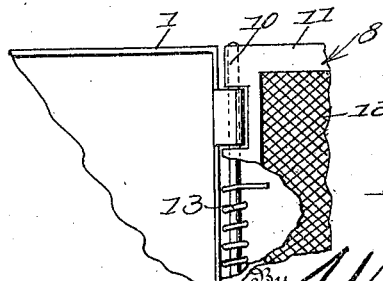
Inventor
M. W. Beckett,
By Watson E. Coleman
Attorney

UNITED STATES PATENT OFFICE.

MILES W. BECKETT, OF MOUNT VERNON, ARKANSAS.

FLYTRAP.

1,413,155. Specification of Letters Patent. Patented Apr. 18, 1922.

Application filed September 12, 1921. Serial No. 499,916.

*To all whom it may concern:*

Be it known that I, MILES W. BECKETT, a citizen of the United States, residing at Mount Vernon, in the county of Faulkner and State of Arkansas, have invented certain new and useful Improvements in Flytraps, of which the following is a specification, reference being had to the accompanying drawings.
It is the purpose of the present invention to provide a device of this kind for trapping flies by permitting the cover of the trap to quickly close, when the releasing device on the handle is actuated.
Another purpose is to provide a trap comprising a body, which may be constructed of any suitable material, either sheet metal, wood or the like preferably the former, including a spring tension cover, with means for holding the cover open, whereby after the interior of the body wherein the bait is placed has gathered sufficient number of flies, the cover may be released, permitting the spring to quickly close it, and entrap the flies.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.
The invention comprises further features and combination of parts as will be hereinafter set forth, shown in the drawings and claimed.

In the drawings:—
Figure 1 is a view in perspective of the improved fly trap constructed in accordance with the invention, showing it attached to a base board, so as to hold the trap firmly in position;
Figure 2 is a longitudinal sectional view through the trap, also showing the cover open;

Figure 3 is a longitudinal sectional view through the trap showing the cover closed;
and Figure 4 is an enlarged detail view of the hinge connection of the cover to the body.

Referring to the drawings, 1 designates the body of the trap, which may be constructed of any suitable material, preferably sheet metal, such as iron, tin or zinc, or may be constructed of wood. Furthermore the body may be any suitable shape, preferably rectangular, and also may be of any suitable proportions. The body may be of sufficient depth, to provide ample space in the trap, when the cover is closed. The body has a suitable handle 2, by which the trap may be moved from place to place.

Mounted on the handle is a cover releasing device 3, which comprises a wire slidably mounted on the handle, there being staples 4 for holding the releasing device in position. The releasing wire has bent portions 5 causing notches 6 to be formed, adapted to engage the transverse ribs or shoulders 7 of the handle, so as to hold the releasing wire in different positions. One end of the releasing wire or device has an upstanding arm, which has a lateral portion to engage the free edge of the cover 8, to hold the cover in an open position. The releasing wire or device is mounted in a groove 9 in the handle, thereby preventing the releasing wire from rotating, and holding the upstanding arm substantially in a perpendicular position, so that its lateral hook may engage the cover.

The cover is hingedly mounted upon the body of the trap as at 10, and comprises a frame 11 preferably rectangular, though not necessarily, upon which wire fabric or screening 12 is stretched, so that the air may freely pass through the cover, when the cover is released and allowed to close, thereby avoiding retarding movement of the cover in the act of closing.

A pair of coil springs 13 are mounted on the body and one end of the cover, and so arranged that certain of their ends will bear against the end of the body, while their other ends will bear against the cover, acting to urge the cover closed, when released.

Projecting laterally from the sides of the body are plates or ears 14 arranged in pairs and provided with slots 15 to receive fastening devices, for the purpose of securing the body of the trap to a base board, table or the like or other support 16, so as to hold the trap in position, particularly when the cover is released and allowed to close.

In the operation, the body of the trap is provided with some suitable bait which will attract the flies, the bait being arranged adjacent the hinged end of the cover on the bottom of the trap, and when it is thought that a sufficient number of flies have collected on the interior of the body, the releasing device may be moved in the direction of the arrow $a$, allowing the cover to quickly and automatically close, hence entrapping flies in the body.

The releasing device 3 at its end is provided with a ring $3^a$, to receive the finger of an operator for releasing the trap and resetting the same.

The invention having been set forth, what is claimed as being useful is:

1. In a fly trap, the combination with a trap body adapted to be baited for the purpose of attracting flies, a cover hingedly mounted on one end of the body and provided with spring means for holding the same closed, said body having a handle, and a cover holding means mounted on the handle provided with means adapted to engage the free end of the cover to hold the same open, whereby the flies may enter the trap, said holding means being manually releasable, to allow the cover to automatically close and entrap the flies in the body.

2. In a fly trap, a trap body having a handle at one end and adapted to be baited for attracting flies, a spring tensioned cover hingedly mounted upon the body and adapted to spring open to a position adjacent the handle, holding means on the handle to hold the cover open and being manually releasable to release the cover, thereby permitting it to automatically close, and means for preventing the holding means from rotating.

3. In a fly trap, a trap body provided with a handle having a slot, a spring tensioned cover hingedly mounted on one end of the body, and adapted to open to a position adjacent the handle, holding means mounted in said slot and adapted to engage the free edge of the cover and hold the same open, and being manually releasable to permit the cover to close.

4. In a fly trap, a trap body provided with a handle having a slot, a spring tensioned cover hingedly mounted on one end of the body, and adapted to open to a position adjacent the handle, holding means mounted in said slot and adapted to engage the free edge of the cover and hold the same open, and being manually releasable to permit the cover to close, means for holding the holding means in different adjusted positions.

5. In a fly trap, a trap body provided with a handle having a slot, a spring tensioned cover hingedly mounted on one end of the body, and adapted to open to a position adjacent the handle, holding means mounted in said slot and adapted to engage the free edge of the cover and hold the same open, and being manually releasable to permit the cover to close, a base board, and means for fastening the body of the trap to the base board.

In testimony whereof I hereunto affix my signature.

MILES W. BECKETT.